Jan. 28, 1947. H. J. DE N. McCOLLUM 2,415,064
SELF-OPERATED FORCED AIR HEATER
Filed July 16, 1943 2 Sheets-Sheet 1
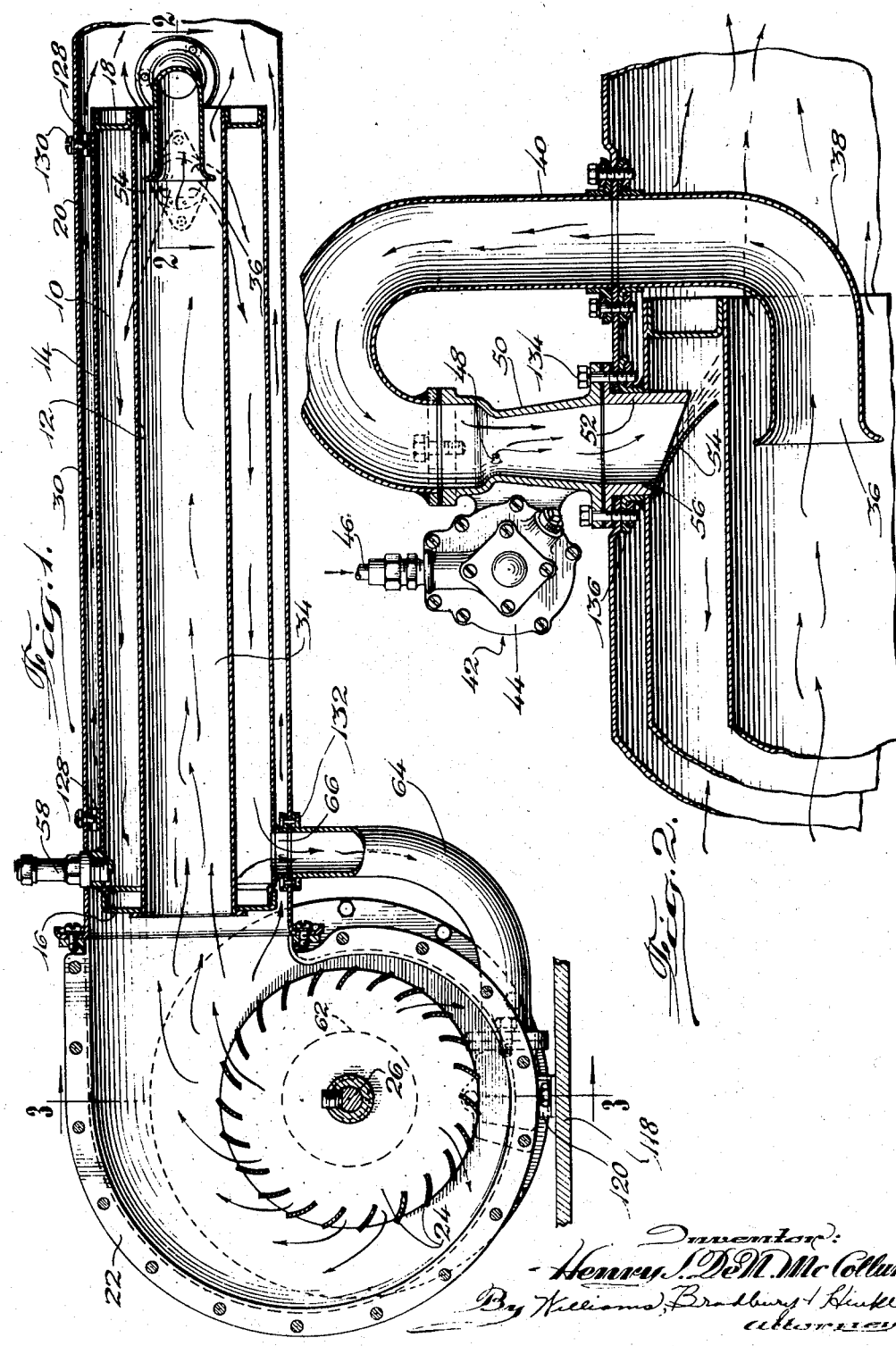

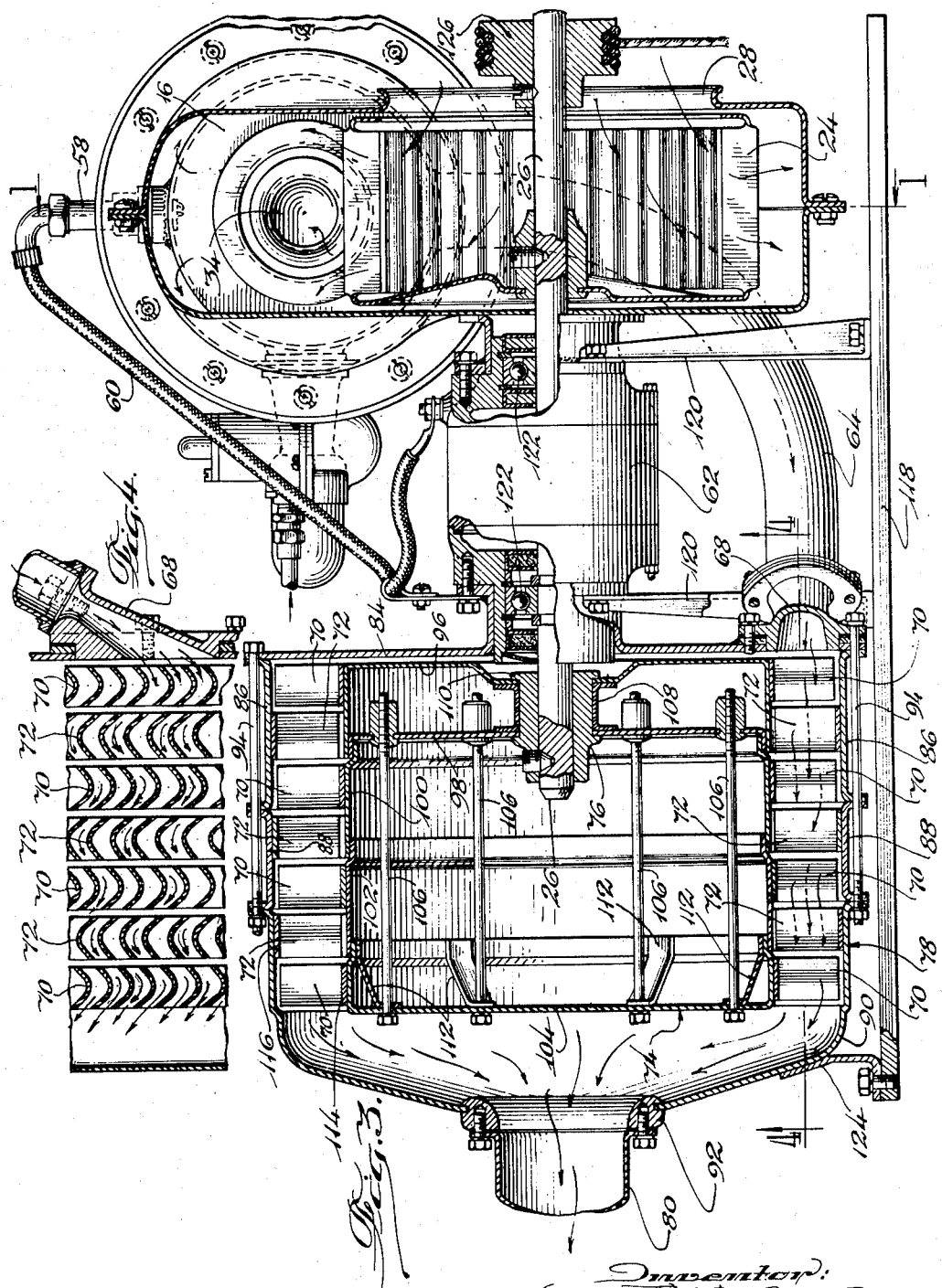

Patented Jan. 28, 1947

2,415,064

UNITED STATES PATENT OFFICE 2,415,064

SELF-OPERATED FORCED AIR HEATER

Henry J. DeN. McCollum, Chicago, Ill.; Thelma McCollum, executrix of said Henry J. DeN. McCollum, deceased, assignor to Stewart-Warner Corporation, Chicago, Ill., a corporation of Virginia Application July 16, 1943, Serial No. 494,943

5 Claims. (Cl. 126—110)

My invention relates to heaters and more particularly to heaters of the internal combustion type.

An object of my invention is to provide a new and improved internal combustion heater which is independent of any external source of power and which contains within itself means for creating a flow of heated ventilating air.

Another object of my invention is to provide a new and improved heater which is highly efficient, compact and of simple and inexpensive construction.

Another object of my invention is to provide a new and improved heater which may be mounted on a base to form a heating unit which may be easily moved from place to place.

A further object of my invention is to provide a self-contained heater having a new and improved combustion chamber.

A further object of my invention is to provide a heater of the self-contained type having new and improved air circulating means.

Other objects and advantages will become apparent as the description proceeds.

The heater disclosed and claimed herein is an improvement on the heating apparatus disclosed and claimed in my co-pending application, Serial No. 496,813, filed July 10, 1943.

In the drawings:

Fig. 1 is a vertical section through a heater embodying my invention and is taken on the line 1—1 of Fig. 3;

Fig. 2 is a partial, horizontal section taken on the line 2—2 of Fig. 1;

Fig. 3 is a transverse, vertical section of the heater and is taken on the line 3—3 of Fig. 1; and Fig. 4 is a partial section taken on the line 4—4 of Fig. 3.

The preferred form of my invention which is illustrated in the drawings has an elongated, annular combustion chamber 10 (Fig. 1) having an inner wall 12, an outer wall 14 and ends 16 and 18 formed of aluminum, stainless steel, copper, or any other suitable material. The combustion chamber 10 is located in a tubular casing 20, whose lefthand end is attached to a blower housing 22 illustrated as enclosing a centrifugal or Sirocco type blower 24 mounted on a shaft 26. The blower housing 22 has an air inlet 28.

When the blower 24 is rotated by the shaft 26, air is drawn in through the inlet 28 and forced into the lefthand end of the tubular casing 20. Part of this air flows through the annular passage 30 between the outer wall 14 of the combustion chamber and the casing 20 and absorbs heat from the combustion chamber. The rest of the air delivered to the lefthand end of the casing 20 enters the passage 34 extending centrally through the combustion chamber, and absorbs heat from the inner wall 12 of this chamber. Most of the air flowing through the passage 34 joins with the air from the passage 30 in the righthand end of the casing 20 and is discharged from this casing as a stream of heated ventilating air.

This stream may pass directly from the casing 20 into a space to be heated or may be conducted through a system of conduits to one or more outlets, as desired. It will be appreciated by those skilled in the art that where the stream of heated ventilating air is to be discharged in the same space through a plurality of outlets or in different spaces, the conduit arrangement for distributing the air may vary with each installation and that the outlet or outlets may be provided with any suitable shutters or other control means.

A minor part of the air flowing in the central passage 34 enters the flared inlet end 36 of an elbow 38 which communicates with the carburetor supply pipe 40 to furnish a restricted amount of heated combustion air to a carburetor indicated generally by reference character 42. This carburetor may have the usual float bowl 44 supplied with fuel from any suitable source by way of a pipe 46. The fuel from the float bowl passes to a jet 48 located in the throat of a Venturi tube 50 where the fuel is mixed with the combustion air to form a combustible mixture. This combustible mixture passes into an induction tube 52 having a tapered end forming a seat for a valve 54 of the reed type.

A screw or other suitable fastening 56 secures the valve 54 to one side of its seat, as clearly indicated in Fig. 2. The valve 54 is of thin, resilient material and is preferably biased toward the open position shown in this Fig. 1, so that the combustible mixture may flow freely past this valve into the righthand end of the annular combustion chamber, except when the valve is temporarily closed by an explosion in the combustion chamber, as hereinafter explained.

Combustible mixture entering the combustion chamber flows lengthwise of this chamber until it substantially fills the chamber and reaches the spark plug 58. This spark plug is connected by an electrical conductor 60 to an alternator 62 driven by the same shaft 26 which drives the blower 24. The spark plug 58 functions throughout the operation of the heater and as soon as the combustible mixture reaches that part of the combustion chamber immediately adjacent the spark plug 58, the entire body of combustible mixture in the annular combustion chamber 10 burns with explosive force. This closes valve 54 and forces a puff or blast of exhaust gases through a pipe 64 which connects the outlet 66 of the combustion chamber with a nozzle 68 of a turbine having alternating sets of rotor and stator blades 70 and 72, respectively.

The four sets of rotor blades are mounted on a wheel 74 having a hub 76 secured to one end of the shaft 26 to drive this shaft and alternator 62 and blower 24 attached thereto. The three sets of stator blades are affixed to the turbine casing 78. After the exhaust gases have passed through the several sets of rotor and stator blades, these gases are discharged through an exhaust pipe 80 attached to the turbine casing.

A feature of my invention lies in the novel structure of the gas turbine whereby this turbine efficiently converts the intermittent flow of exhaust gases into power for driving the alternator 62 and blower 24. As clearly shown in Fig. 3 of the drawings, the turbine casing 78 comprises a sheet metal end wall 84 and three annular sections 86, 88 and 90 which form the side wall and other end wall of the casing. All of these wall sections are adapted to be formed of sheet metal stampings or other inexpensive parts and a ring 92 is crimped or otherwise secured to the section 90 to provide an attaching means for the exhaust pipe 80.

The annular sections 86, 88 and 90 are provided with outwardly projecting annular flanges which stiffen these sections and also afford openings in which securing bolts 94 are located. These securing bolts hold the several sections of the casing in assembled relationship and afford convenient and inexpensive means for holding the parts together and for permitting rapid assembly or disassembly of the casing.

The turbine wheel 74 is likewise composed of several inexpensive stampings or other cheaply formed parts, these stampings comprising a stamping 96 carrying one set of rotor blades, a cup-shaped stamping 98 affording additional rigidity, a second rotor-carrying stamping 100, a third rotor-carrying member 102 and a fourth rotor-carrying member 104 which is also in the shape of a cup to provide rigidity to the lefthand end of the wheel. The members 98, 100, 102 and 104 are secured together by bolts 106 and this assembly, together with member 96 and a spacer ring 108 are mounted on a hub 76 by rolling over a lip 110. The cup-shaped member 104 is preferably reinforced by angular brackets 112 welded or otherwise suitably secured thereto.

From the foregoing description of the turbine wheel and casing, it is clear that these parts may be inexpensively made and quickly assembled. Furthermore these parts are of light weight and this is particularly desirable where the heating apparatus is mounted on a portable base so that it may be moved from place to place.

Each set of rotor blades 70 is mounted on an annular base or ring 114 which may be welded or otherwise suitably secured to its section of the turbine wheel. Each set of stator blades is likewise mounted on an annular base or ring 116 which may be suitably secured to its section of the casing 78. The rotor and stator blades are preferably given shapes like those indicated in Fig. 4 in order to afford maximum efficiency in utilizing the energy of the exhaust gases. While I have shown a turbine having four sets of rotor blades and three sets of stator blades, it is to be understood that my invention is not limited to this particular number of sets of blades, as the number of sets of stator and rotor blades may vary with different sizes of heaters or to suit other conditions of use.

In the drawings I have illustrated my novel heater as being mounted on a base 118 to which the several elements may be attached by brackets or in any other suitable manner. In Fig. 3 the base is shown as being provided with a pair of upstanding brackets 120 having their upper ends attached to the housing of the alternator 62. This housing provides roller bearings 122 which support the shaft 26 and the turbine wheel, blower wheel and alternator rotor mounted on this shaft. A further bracket 124 is shown as connecting the base 118 with the lefthand end of the turbine casing and such additional brackets or supports may be provided as are necessary or desirable to provide adequate support for the several parts of the heater under different conditions of use. The particular mounting shown in the drawings provides a compact, light weight unit which may be moved from place to place if desired.

Because my new and improved heater requires only a supply of fuel and is independent of any external source of power, this heater is particularly adapted for mounting in such manner that the heater may be moved from one location to another without disturbing the relationship between the several parts of the heater.

When it is desired to start the heater, a pull rope may be wound about the drum 126 attached to the righthand end of the shaft 26 whereby this shaft can be rotated by giving a quick pull on the pull rope. Rotation of this shaft operates the alternator 62 to create sparks across the gap of the spark plug 58. Rotation of this shaft also rotates blower 24 and turbine wheel 104.

Blower 24 forces air through passage 34, elbow 38 and pipe 40 to Venturi tube 50, where this air is mixed with fuel and the resulting combustible mixture flows past open valve 54 into combustion chamber 10. This in-flowing, combustible mixture displaces air and exhaust gases from this combustion chamber and as soon as this combustible mixture reaches the immediate vicinity of the spark plug 58, ignition occurs. The resulting explosion closes valve 54 and creates a blast of exhaust gases through pipe 64 to turbine nozzle 68, where this blast passes through the alternating sets of rotor and stator blades to drive the turbine wheel 104.

The combustion of the fuel in the annular combustion chamber 10 transfers heat to the inner and outer walls 12 and 14, respectively, of this chamber and this heat in turn is transmitted to the air flowing through the annular passage 30 and the central passage 34. Most of this air is used for ventilating or heating purposes, but a small portion of this heated air flows to the carburetor where it is mixed with fuel to form the combustible mixture. The preheating of the carburetor air materially assists in vaporizing the fuel and in producing a readily combustible mixture of fuel and air. As soon as the pressure in the combustion chamber has subsided, valve 54 opens and another charge of combustible mixture starts flowing into the righthand end of the combustion chamber. When this new charge reaches the vicinity of the spark plug 58, another explosion takes place and the cycle is repeated. The heater continues to operate in this manner until the fuel supply for the heater is exhausted or until any suitable control valve is manually or automatically operated to cut off the fuel supply to the heater.

It is to be noted that the annular arrangement of the combustion chamber provides long inner and outer walls through which heat may be readily transferred to the ventilating and combustion air and that this type of combustion chamber may easily be mounted in a tubular casing of inexpensive construction.

In the particular embodiment shown, the outer wall 14 of the combustion chamber has a pair of C-shaped brackets 128 welded or otherwise suitably secured thereto and screws 130 passing through the casing 20 hold the combustion chamber in place. The combustion chamber is also secured in the casing by screws 132 and 134. Screws 132 pass through the casing and secure the flanges of pipe 64 and the combustion chamber outlet to opposite sides of the casing. Screws 134 attach the carburetor and induction pipe to the casing and also extend into a flange 136 of a fuel inlet welded to the outer wall 14 of the combustion chamber.

While I have illustrated and described only a single embodiment of my invention, it is to be understood that my invention may assume numerous other forms and that my invention includes all modifications, variations and equivalents coming within the scope of the appended claims.

I claim:

1. A heater of the class described, comprising a cylindrical casing, means forming an annular combustion chamber located in said casing and spaced therefrom, said combustion chamber and casing comprising a heat exchanger having an annular air passage and a central air passage, means including a blower for forcing air through said passages, a carburetor for delivering combustible mixture to one end of said combustion chamber, a pipe for conducting part of the air leaving said heat exchanger to said carburetor, a check valve interposed between said carburetor and combustion chamber, ignition means at the opposite end of said combustion chamber, a prime mover operated by exhaust gases from said combustion chamber, a passage connecting said prime mover with said last-named end of the combustion chamber, means driven by said prime mover for operating said ignition means, and a blower driven by said prime mover for supplying air to said passages of the heat exchanger.

2. An internal combustion heater of the class described comprising wall means forming a combustion chamber and heat exchange passages contiguous thereto for ventilating air to be heated, inlet and outlet means associated with said passages, said combustion chamber and heat exchange passages being stationary, a prime mover communicating with said combustion chamber and operated by the exhaust gases therefrom, a blower driven by said prime mover, means including said blower for supplying air for combustion to said combustion chamber and ventilating air to the inlet means, said outlet means being adapted to deliver heated ventilating air to a space to be heated outside the heater, means for supplying fuel to said combustion chamber, means for igniting said fuel in the combustion chamber, and flow restrictive means associated with said combustion air supply means so proportioned that the ventilating air comprises the major portion of the total air supplied and absorbs the major portion of the heat of the hot gases formed in the combustion chamber.

3. An internal combustion heater of the class described comprising wall means forming a combustion chamber and heat exchange passages contiguous thereto for ventilating air to be heated, inlet and outlet means associated with said passages, a turbine communicating with said combustion chamber and adapted to be driven by exhaust gases therefrom, a blower operatively connected to said turbine to be driven thereby, means including said blower for supplying air for combustion to said combustion chamber and ventilating air to the inlet means, said outlet means being adapted to deliver heated ventilating air to a space to be heated outside the heater, means for supplying fuel to said combustion chamber and for mixing said fuel with said combustion air, a spark plug for igniting fuel in said combustion chamber, a source of electric current connected to energize said spark plug, and flow restrictive means associated with said combustion air supply means so proportioned that the ventilating air comprises the major portion of the total air supplied and absorbs the major portion of the heat of the hot gases formed in the combustion chamber.

4. A heater of the class described having means forming a combustion chamber of annular cross-section having a central passageway therethrough, a carburetor for supplying a combustible mixture to one end of said combustion chamber, a casing enclosing said combustion chamber in spaced relation thereto, air supply means for the heater including a blower for forcing air to be heated through the space between said combustion chamber and said casing and also through said central passageway in out-of-contact heat exchange relation to the hot gases formed in the combustion chamber, means for diverting a portion of the air flowing through said heater to said combustion chamber, means forming an outlet passage adapted for delivering heated ventilating air from the space between the combustion chamber and the casing and from said central passageway to a space to be heated, flow restrictive means associated with the air supply means for said combustion chamber so proportioned that the ventilating air comprises the major portion of the total air supplied and absorbs the major portion of the heat of the hot gases formed in the combustion chamber, a spark plug at the other end of said combustion chamber, a turbine communicating with said other end of the combustion chamber and operated by exhaust gases therefrom, a driving connection between said turbine and said blower, and a source of electric current connected to energize said spark plug.

5. A heater having means forming an annular combustion chamber having a central passageway therethrough, means including a blower for directing ventilating air to be heated over said combustion chamber in out-of-contact heat exchange relation to the hot gases formed in said chamber, said means also directing air through said central passageway in out-of-contact heat exchange relation to hot gases formed in the combustion chamber, conduit means leading a portion of the air from said central passageway to the combustion chamber, a carburetor for adding fuel to said portion of the air in said conduit and supplying a combustible mixture to one end of said combustion chamber, means at the other end of said combustion chamber for igniting said mixture, said conduit means serving to proportion the ventilating air and the air led to the combustion chamber so that said ventilating air comprises the major portion of the air supplied by the blower and absorbs the major portion of heat of the hot gases formed in the combustion chamber as it flows over the combustion chamber and through said central passage, a check valve interposed between said combustion chamber and carburetor, a prime mover communicating with the combustion chamber at a point adjacent said ignition means, and a driving connection between said prime mover and blower.

HENRY J. DeN. McCOLLUM.